G. F. CLARK.
COMBINED INTAKE AND EXHAUST MANIFOLD.
APPLICATION FILED DEC. 27, 1919.
1,399,930.
Patented Dec. 13, 1921.
2 SHEETS—SHEET 2.
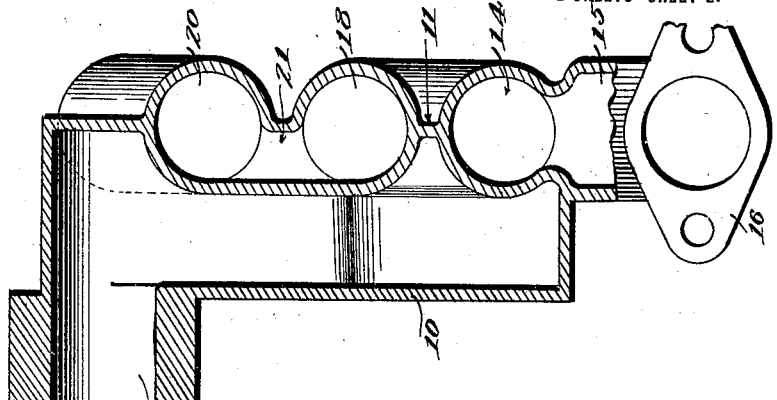
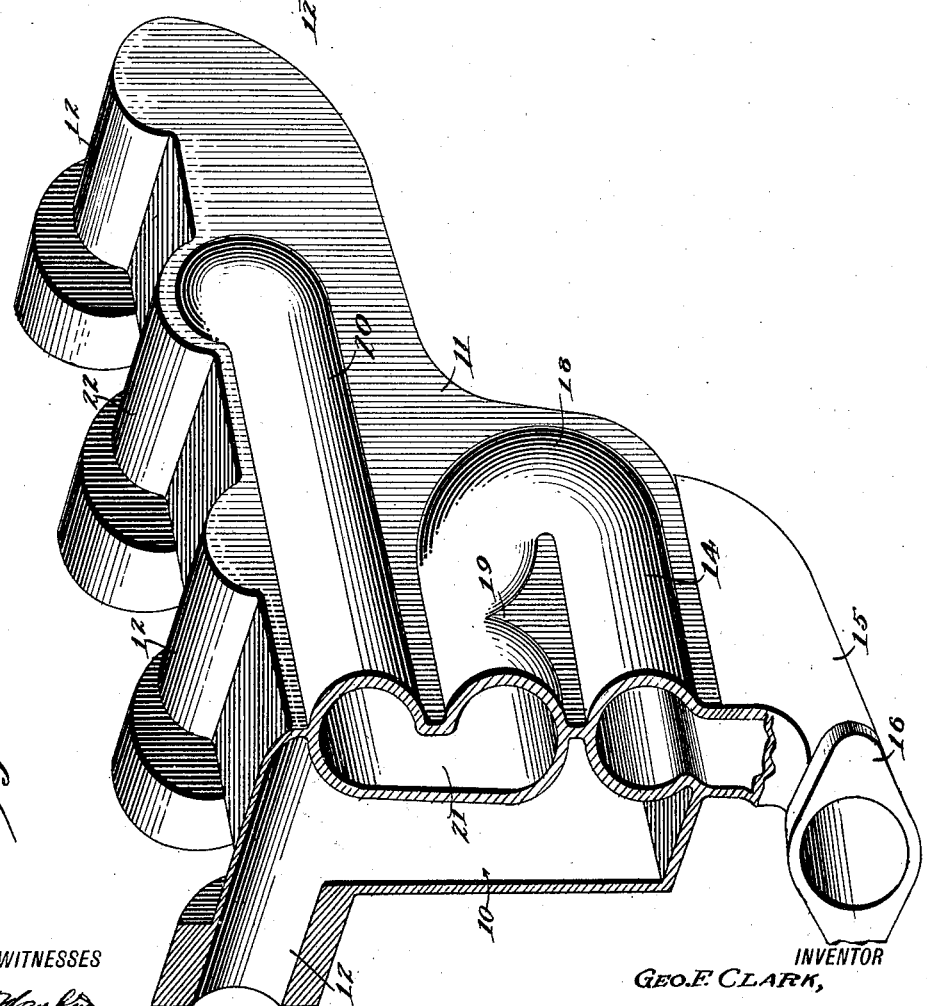
WITNESSES
INVENTOR
GEO. F. CLARK,
BY
ATTORNEYS

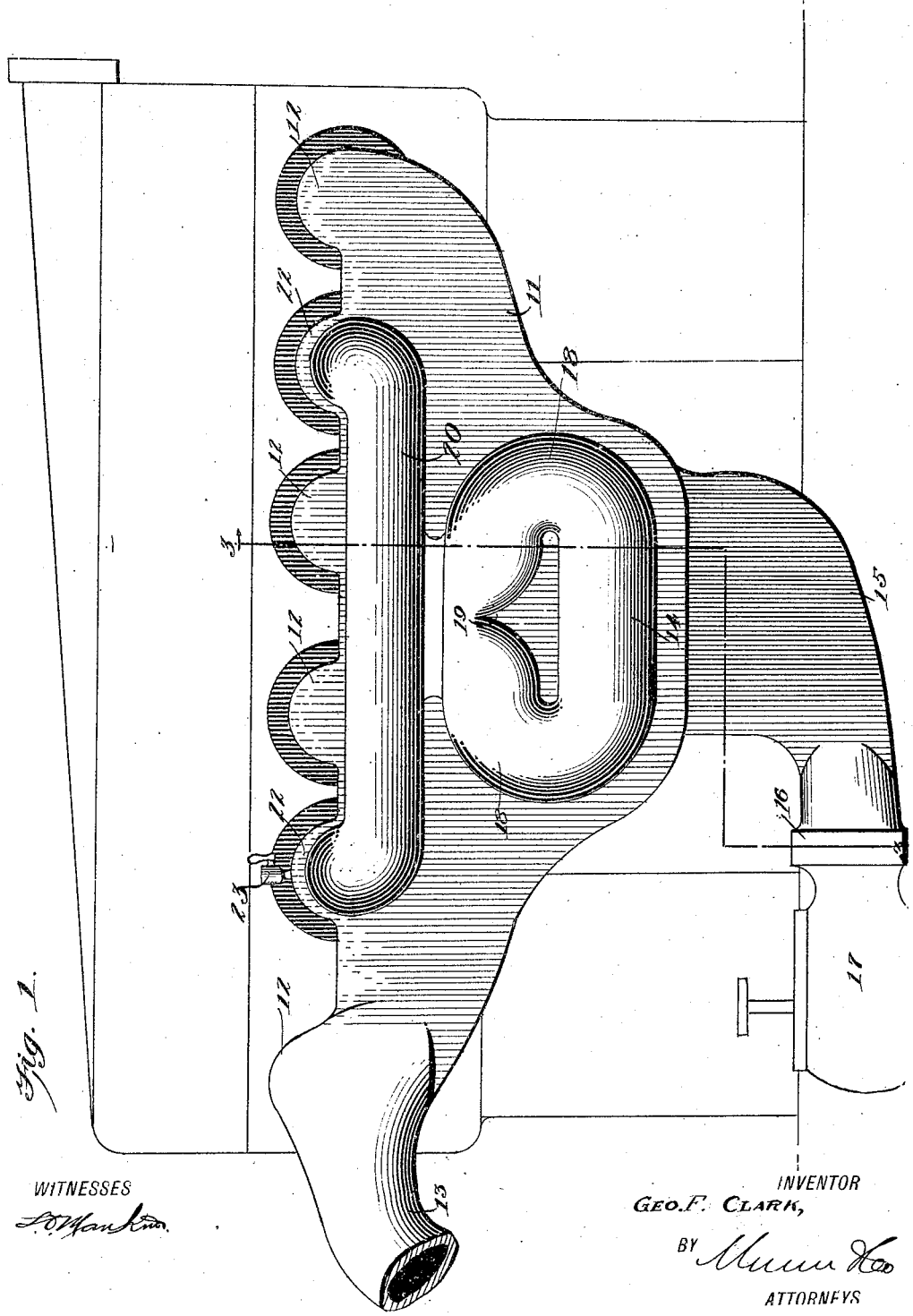

UNITED STATES PATENT OFFICE.

GEORGE FLORIAN CLARK, OF DES MOINES, IOWA.

COMBINED INTAKE AND EXHAUST MANIFOLD.

1,399,930.  Specification of Letters Patent.  Patented Dec. 13, 1921.

Application filed December 27, 1919. Serial No. 347,673.

*To all whom it may concern:*

Be it known that I, GEORGE FLORIAN CLARK, a citizen of the United States, and a resident of Des Moines, in the county of Polk and State of Iowa, have invented certain new and useful Improvements in Combined Intake and Exhaust Manifolds, of which the following is a specification.

My present invention relates generally to gaseous fuel vaporizers and more particularly to a combined intake and exhaust manifold structure the arrangement of which is such that gaseous fuel for engine consumption will be intimately fixed and vaporized in its passage to the engine, by the influence of the hot exhaust gases.

In accordance with my invention the combined manifold is of comparatively small cost, and is capable of easy installation as compared to devices of a somewhat similar nature now in general use.

In the accompanying drawings which illustrate my invention and form a part of this specification, Figure 1 is a side view illustrating the practical application of my invention, Fig. 2 is a sectional perspective view of a portion of the invention removed, and Fig. 3 is a vertical transverse section taken substantially on line 3—3 of Fig. 1.

Referring now to these figures the combined device proposed by my invention includes laterally spaced inner and outer walls 10 and 11 respectively, the space between which is entirely open to the inner ends of laterally projecting tubular exhaust connections 12 which are arranged along the upper portion of the manifold so as to thus place the several exhaust connections in open communication with the body of the manifold or rather the space inclosed by its walls, one end of which tapers to an exhaust pipe connection 13 seen in Fig. 1.

Integral with the outer wall 11 of the manifold is a gaseous fuel passage with the lower horizontally disposed portion 14 of which an intake pipe 15 communicates. This pipe has a flanged end 16 for connection with a carbureter 17 seen in Fig. 1 so that the carbureted fuel readily finds its way into the portion 14 of the fuel channel. At its opposite ends the lower portion 14 communicates with upwardly and inwardly curved portions 18 of the channel, the upper portions of whose inner ends curve upwardly by virtue of an intermediate transverse constricted portion 19 which acts to slightly choke the volume of fuel and cause more intimate or close relation between the atoms of air and liquid fuel. The upper inner ends of the curved portions 18 of the channel communicate with the upper lengthy horizontal portions 20 of the channel through an elongated relatively narrow passage way 21, which is narrowed by virtue of being indented from outside of the manifold as clearly seen in Figs. 2 and 3.

The result of this structure is that the mixture is divided into two portions immediately upon its reception within the lower horizontal portion 14 of the fuel channel, the portions so divided passing upwardly around the curved channel portions 18 and joining with one another for passage vertically at the choked portion of the channel so as to cause thorough intermixing of the same immediately prior to their movement through the relatively narrow passage 21 by means of which they are thrown against the inner portion of the wall of the channel at the center of its upper horizontal distributing section 20 and also give them a swirling motion by virtue of their entrance into the upper section 20 of circular cross section from the slot like passage 21 at one side of the center of such circle.

The upper horizontally disposed distributing portion 20 of the intake channel communicates at its opposite ends with tubular intake connections 22, in one of which, as seen in Fig. 1, I may mount a priming cup 23 for use in severely cold weather.

I have found that by means of a combined manifold of this nature, approximately one half of the intake channel of which is exposed to the hot exhaust gases passing through the manifold body, together with the other features described, it is possible to uniformly and thoroughly heat the fuel and at the same time avoid all danger of over heating by virtue of the formation of the intake fuel channel in the outer wall of the combined manifold which is obviously spaced considerably apart from the engine in connection with which it is utilized.

By thus properly and uniformly heating the fuel, more thorough consumption is promoted, the collection of carbon avoided and economy in fuel effected, and I have found that various fuels may be utilized with good results where previously gasolene has been required.

I claim:

A combined intake and exhaust manifold comprising a body having inner and outer spaced walls forming an exhaust passage therebetween, laterally extending intake and exhaust connecting tubes, the exhaust tubes of which communicate with the said exhaust passage; a lower intake pipe, and an intake channel formed in the outer wall with a portion of its surface exposed to the exhaust passage and including an upper horizontal distributing portion in communication at its opposite ends with the tubular intake connections, a lower horizontal portion in communication with the intake pipe, curved sections extending upwardly and inwardly into one another from the ends of the lower horizontal portion and partially choked at their upper meeting ends by a laterally constricted section forming a relatively narrow slot like passage way above the upper meeting ends of the curved sections and between the same and the distributing portion approximately at the center of the latter, said upper meeting ends of said curved sections having a fuel guiding portion to deflect fuel upwardly through said slot-like passage.

GEORGE FLORIAN CLARK.